(12) United States Patent
Rawlings et al.

(10) Patent No.: US 7,300,095 B2
(45) Date of Patent: Nov. 27, 2007

(54) FOLDING CONVERTIBLE TOP WITH INTEGRAL BOOT

(76) Inventors: Stephen P. Rawlings, 7903 Wadding Dr., Onsted, MI (US) 49265; Albert W. Harrison, III, 8044 Saint Paul, Detroit, MI (US) 48214

(*) Notice: Subject to any disclaimer, the term of this patent is extended or adjusted under 35 U.S.C. 154(b) by 0 days.

(21) Appl. No.: 11/603,762

(22) Filed: Nov. 22, 2006

(65) Prior Publication Data
US 2007/0063532 A1 Mar. 22, 2007

Related U.S. Application Data

(63) Continuation of application No. 10/415,321, filed on Apr. 7, 2004, now Pat. No. 7,163,255.

(51) Int. Cl.
*B60J 7/00* (2006.01)
(52) U.S. Cl. .................. 296/116; 296/121; 296/107.08
(58) Field of Classification Search .......... 296/107.01, 296/108, 116, 121, 107.08, 107.09, 107.15, 296/123
See application file for complete search history.

(56) References Cited

U.S. PATENT DOCUMENTS

| | | | | |
|---|---|---|---|---|
| 6,270,143 B1* | 8/2001 | Heselhaus et al. | ..... | 296/107.01 |
| 6,416,111 B1* | 7/2002 | Neubrand | ..... | 296/107.09 |
| 6,692,061 B1* | 2/2004 | Willard | ..... | 296/116 |
| 6,796,595 B2* | 9/2004 | Doncov | ..... | 296/107.09 |
| 7,163,255 B2* | 1/2007 | Rawlings et al. | ..... | 296/116 |
| 2001/0040385 A1* | 11/2001 | Obendiek | ..... | 296/108 |

* cited by examiner

*Primary Examiner*—Joseph D. Pape

(57) ABSTRACT

A pair of side linkages for raising a convertible top between a raised position, covering the vehicle body passenger compartment, through a body opening, and a lowered position folded into a storage compartment within the vehicle body, said top including a header for engaging the vehicle windshield in the top raised position and at least one crossbow extending between the side linkages, each linkage comprising side rails pivoted to and extending rearwardly from the header, and a plurality of links forming 4-bar linkages connecting the header, side rails and vehicle body for folding the top in a Z-shaped folding action to a compact shape in the storage compartment such that the header is not inverted and covers the folded top and closes the body opening.

19 Claims, 7 Drawing Sheets

FOLDING CONVERTIBLE TOP WITH INTEGRAL BOOT

CROSS-REFERENCE TO RELATED PATENT APPLICATIONS

This patent application is a continuation of U.S. patent application No. 10/415,321 filed Apr. 7, 2004 (now U.S. Pat. No. 7,163,255 issued Jan. 16, 2007) which claims priority to PCT/US01/49236 filed Oct. 20, 2001.

TECHNICAL FIELD

This invention relates to vehicle convertible tops and, more particularly, to a top having a linkage which folds a top so that the header serves as a boot to cover the top when stored.

BACKGROUND OF THE INVENTION

Many different types of folding convertible soft and hard tops have been developed to enhance motoring pleasure by enabling a driver to selectively open and close the passenger compartment. These tops utilize a variety of different folding linkages, each of which are designed to accommodate the particular mechanical constraints of a specific vehicle application. It is desirable to utilize a top folding linkage that is simple, compact and stores the top in as little space as possible.

When these tops are lowered into a storage compartment, the header is normally inverted. This requires that the top or a portion of the top to be covered by a soft or hard boot to prevent accumulation of dust or other contaminants that would be dumped into the passenger compartment when the header rotates as the top is raised. The boot may be manually installed, or, is automatically manipulated by power operators, usually hydraulic cylinders. Installation of these boots requires time and/or effort to install. In the case of the soft boot, it requires separate storage when removed to enable the top to be raised.

It would be desirable to provide a convertible top that does not require a separate boot to close the top storage compartment, and incorporates a linkage, which stores the top in a compact configuration, with the outer surface of the header covering the remainder of the stored and folded top.

BRIEF SUMMARY OF THE INVENTION

It is therefore an object of this invention to provide a convertible top that does not require a separate boot to close the top storage compartment, and incorporates a linkage, which stores the top in a compact configuration, with the exterior of the header covering the remainder of the stored and folded top.

Accordingly, this invention features a convertible top and a pair of side linkages for raising the top between a raised position, covering the vehicle body passenger compartment, through a body opening, and a lowered position folded into a storage compartment within the vehicle body. The top includes a cover, a header for engaging the vehicle windshield in top raised position, and at least one crossbow extending between the side linkages to support the cover in top raised position. Each side linkage includes a side rail pivoted to and extending rearwardly from the header and other links for folding the top in a Z-shaped folding action to a compact shape in the storage compartment such that the header is not inverted and covers the folded top and closes the body opening.

This invention also features 4-bar side linkages that enable the top to fold in the Z-shape.

Another feature of this invention is the use of a lost-motion connection between the header and a side rail to enable relative lateral movement during raising and lowering of the top.

These and other objects and features of this invention will become more readily apparent upon reference to the following detailed description of a preferred embodiment, as illustrated in the accompanying drawings, in which:

DETAILED DESCRIPTION OF THE INVENTION

Figure 1:
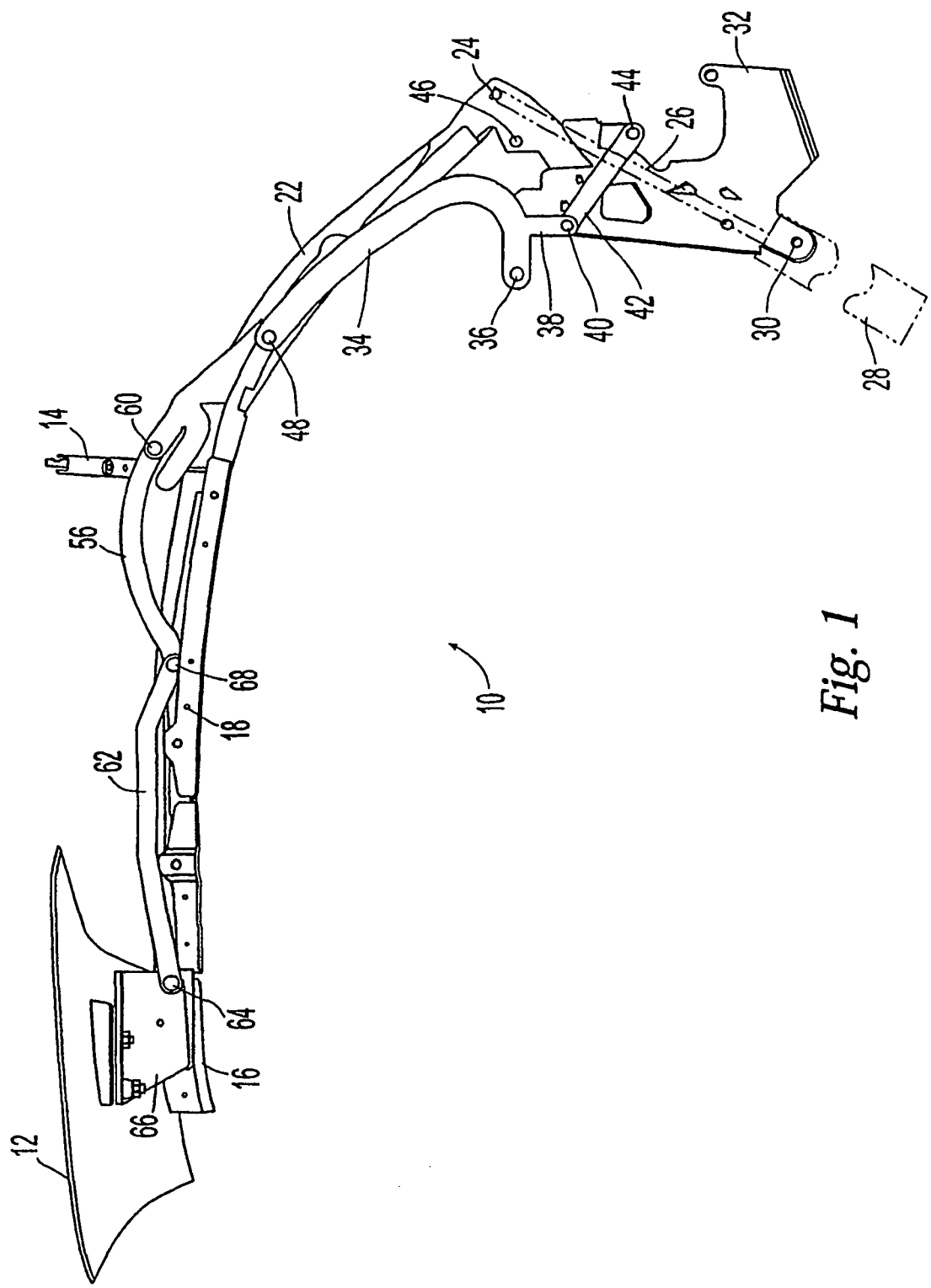
FIGS. 1, 2, 3 and 4 are side views of a convertible top of this invention, sequentially shown in fully raised, ¾ raised, half raised, and fully lowered and stored position.

Referring now to the drawings, a convertible top 10 has a conventional flexible fabric, or other similar material, cover (not illustrated) that is supported at its front by a plate-like extended header, or 1-bow, 12, and an intermediate bow 14. The cover for top 10 is conventionally attached to the vehicle body (not illustrated). Header 12 extends sufficiently rearward so as to incorporate what would normally be an intermediate 2-bow.

Figure 2:
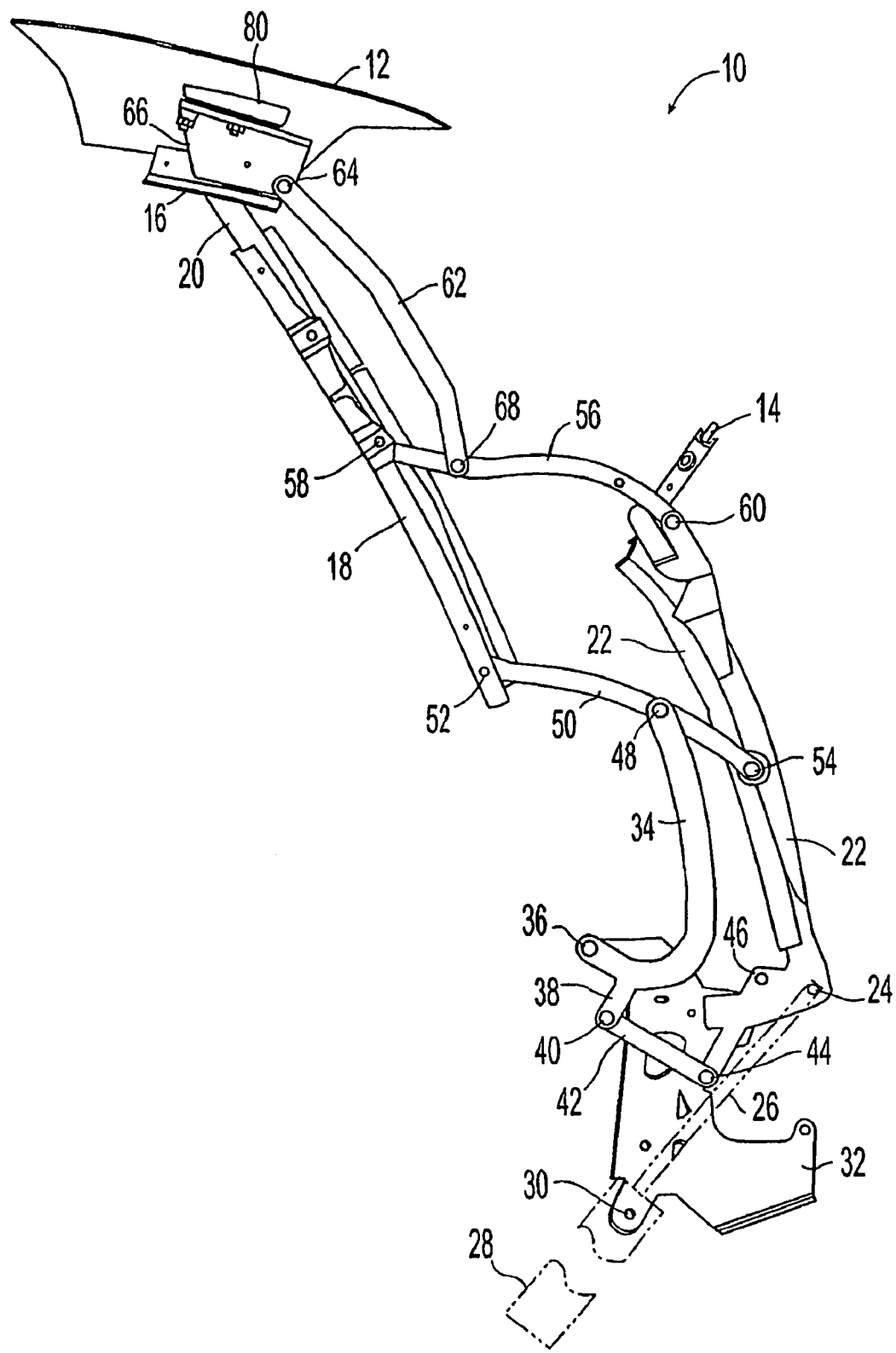
Figure 3:
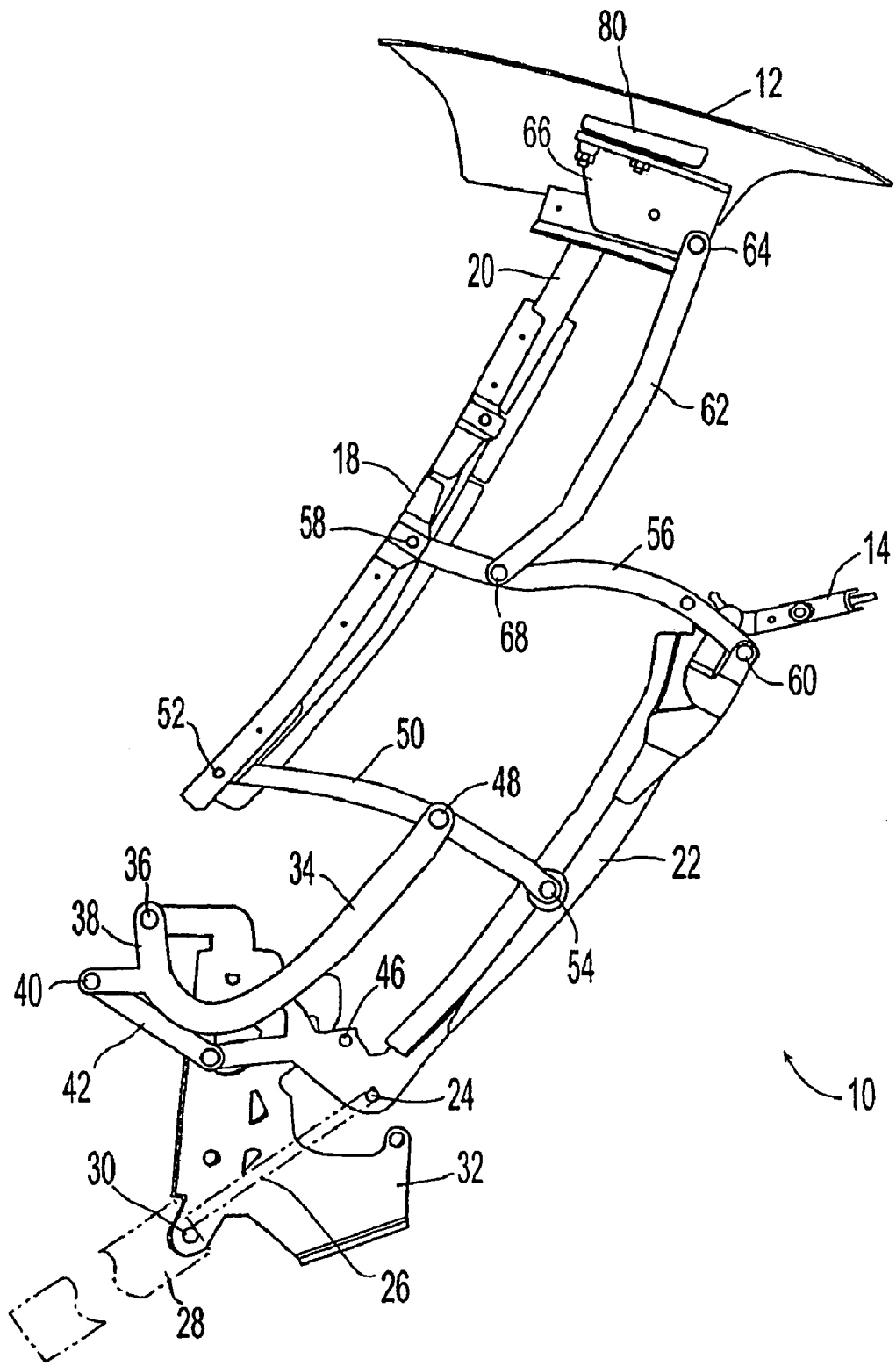
Figure 4:
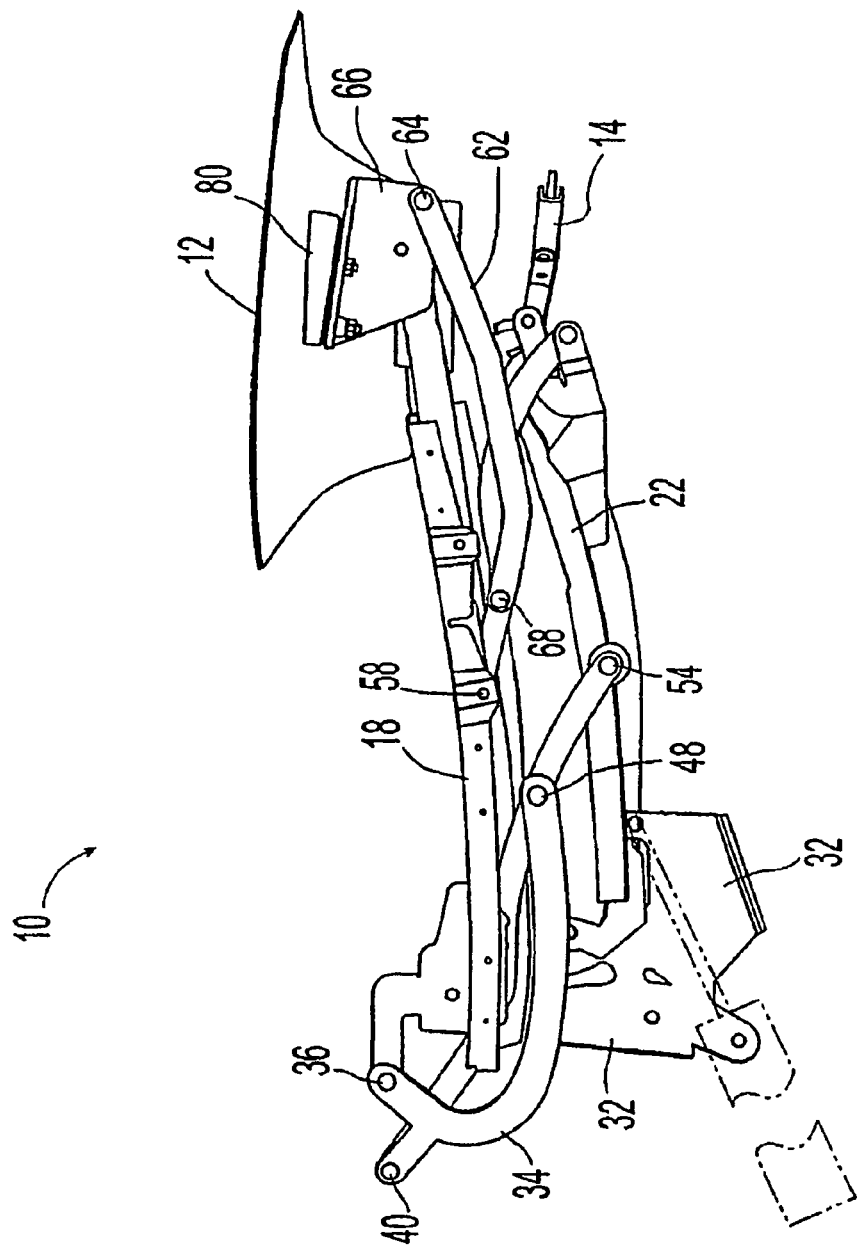
Figure 5:
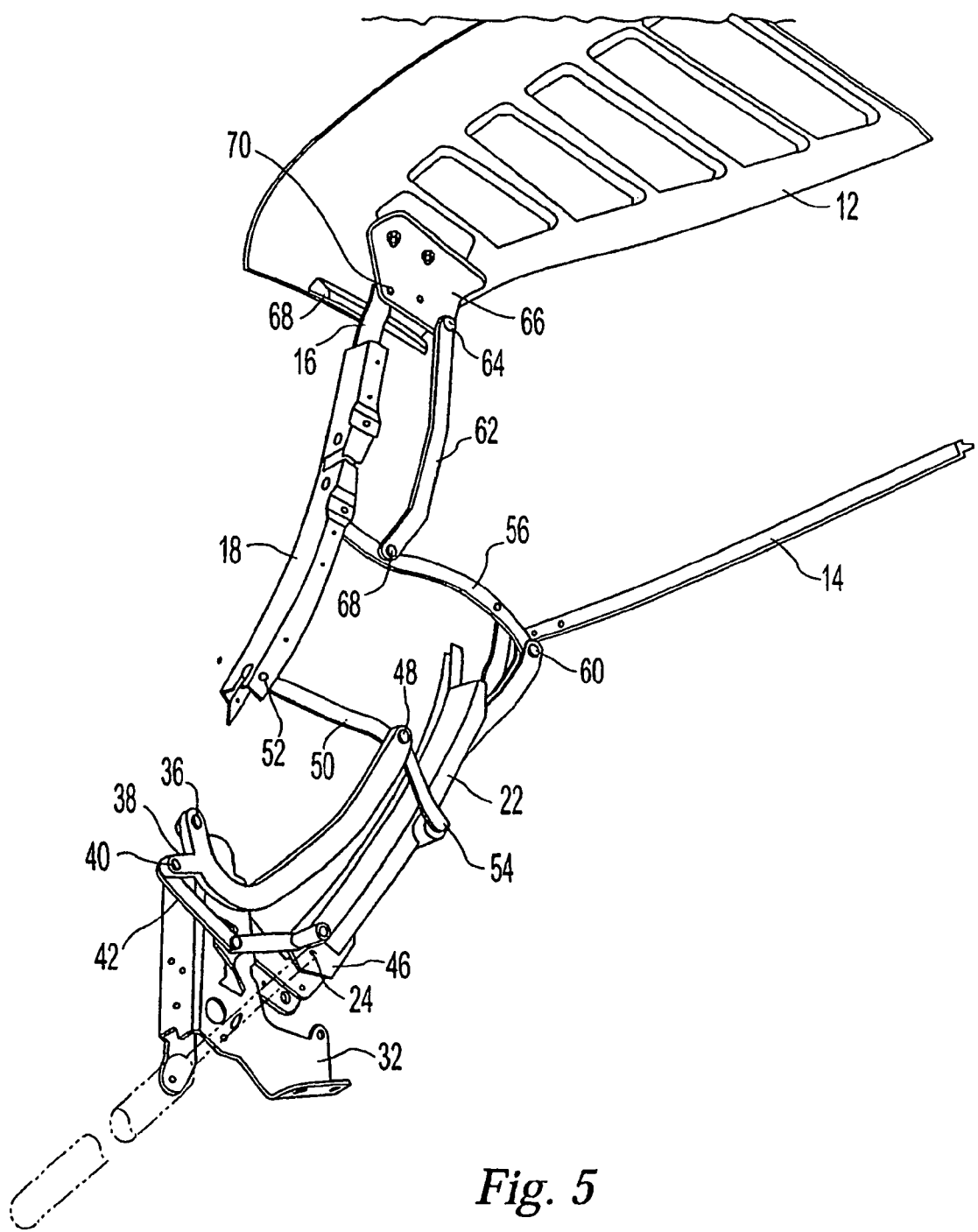
FIG. 5 is a perspective view of the top in its FIG. 3 position.

These supporting bows are pivotally connected at each side by an articulated linkage, which is conventionally operable by hydraulic cylinders, or other means (not shown) to raise and lower the top between an extended raised position covering the vehicle passenger compartment (not illustrated), as shown in FIG. 1, through the intermediate positions shown in FIGS. 2, 3 and 5, and a lowered and folded position, as shown in FIG. 4, within a storage compartment in a vehicle body (not illustrated).

Only one articulated side linkage is illustrated, since both are identical/symmetrical. The linkages comprise a front rail 16 that is secured to, and moves with header 12. A middle rail 18 has a forward extension 20 that is connected to front rail 16, as will be later described. A rear rail 22 is pivoted adjacent its lower end at 24 to the rod 26 of a hydraulic cylinder 28, which is pivoted at 30 to a body-mounted mounting bracket 32.

A lower control arm 34 is pivoted to bracket 32 at 36 and has an arm 38 that pivotally mounts one end 40 of a lower connecting link 42 that is pivoted at its other end 44 to the lower end 46 of rear rail 22. The upper end of lower control arm 34 is pivoted at 48 intermediate the ends of a middle connecting link 50 that has one end pivoted at 52 to middle rail 18 and its other end pivoted at 54 to an intermediate portion of rear rail 22.

The upper end of an upper connecting link 56 is pivoted at 58 to an intermediate portion of middle side rail 18, while its other end is pivoted to the upper end of rear rail 22 at 60. An upper control arm 62 is pivoted at 64 to a header-mounted bracket 66, and to an intermediate portion of upper connecting link 56 at 68.

The linkage just described, of course, is duplicated on the other side of the vehicle. It comprises three four-bar linkages that allow the top 10 to fold into a very compact, layered arrangement. As can be seen from viewing the folding sequence illustrated in FIGS. 1, 2, 3 and 4, top 10 folds into the form of a collapsed "Z". This is enabled by employing the four-bar linkages. The first linkage is formed by header 12, front rail 20, upper control arm 62 and the upper portion of upper connecting link 56, as defined by pivots 64, 68, 58 and the connection 70 between extension 20 of middle rail 18 and front rail 16.

The second four-bar linkage comprises upper connecting link 56, the lower portion of middle rail 18, middle connecting link 50 and the upper portion of rear rail 22, as defined by pivots 58, 52, 54 and 60. The third four-bar linkage is formed by the lower portion of middle connecting link 50, lower control arm 34, lower connecting link 42 and the lower portion of rear rail 22, as defined by pivots 48, 40, 44 and 54.

Thus, the entire top 10 moves about body linkage pivot 36 and cylinder pivot 30, as controlled by cylinder 28 and the three four-bar linkages described above. This Z-fold provides a more compact arrangement requiring less space within the vehicle body than prior arrangements, while also enabling the extended header to cover the folded top and eliminate the necessity of using a separate boot cover.

Figure 6:
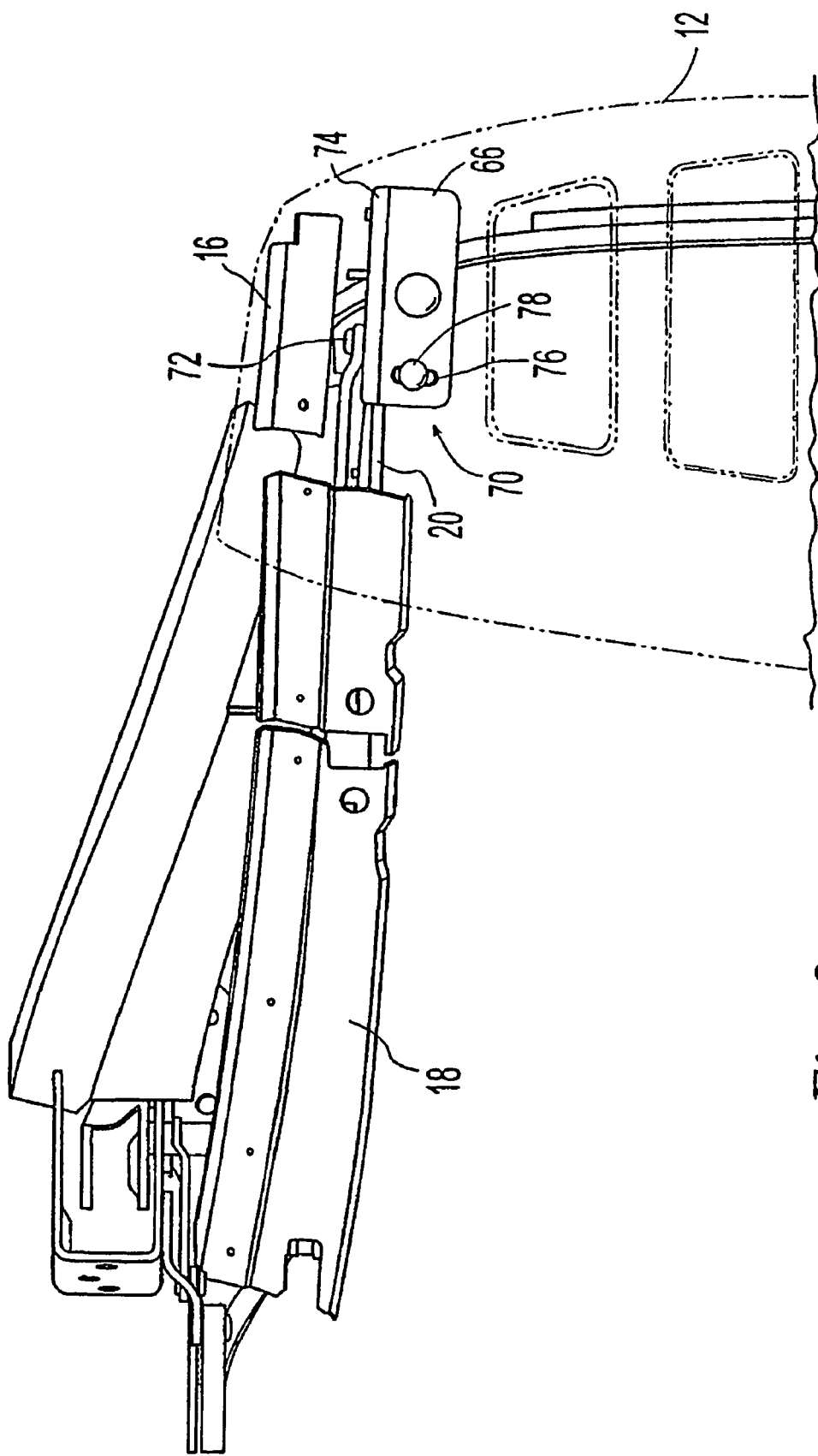
FIG. 6 an enlarged bottom detail view of the juncture of the header and the front side rail.
Figure 7:
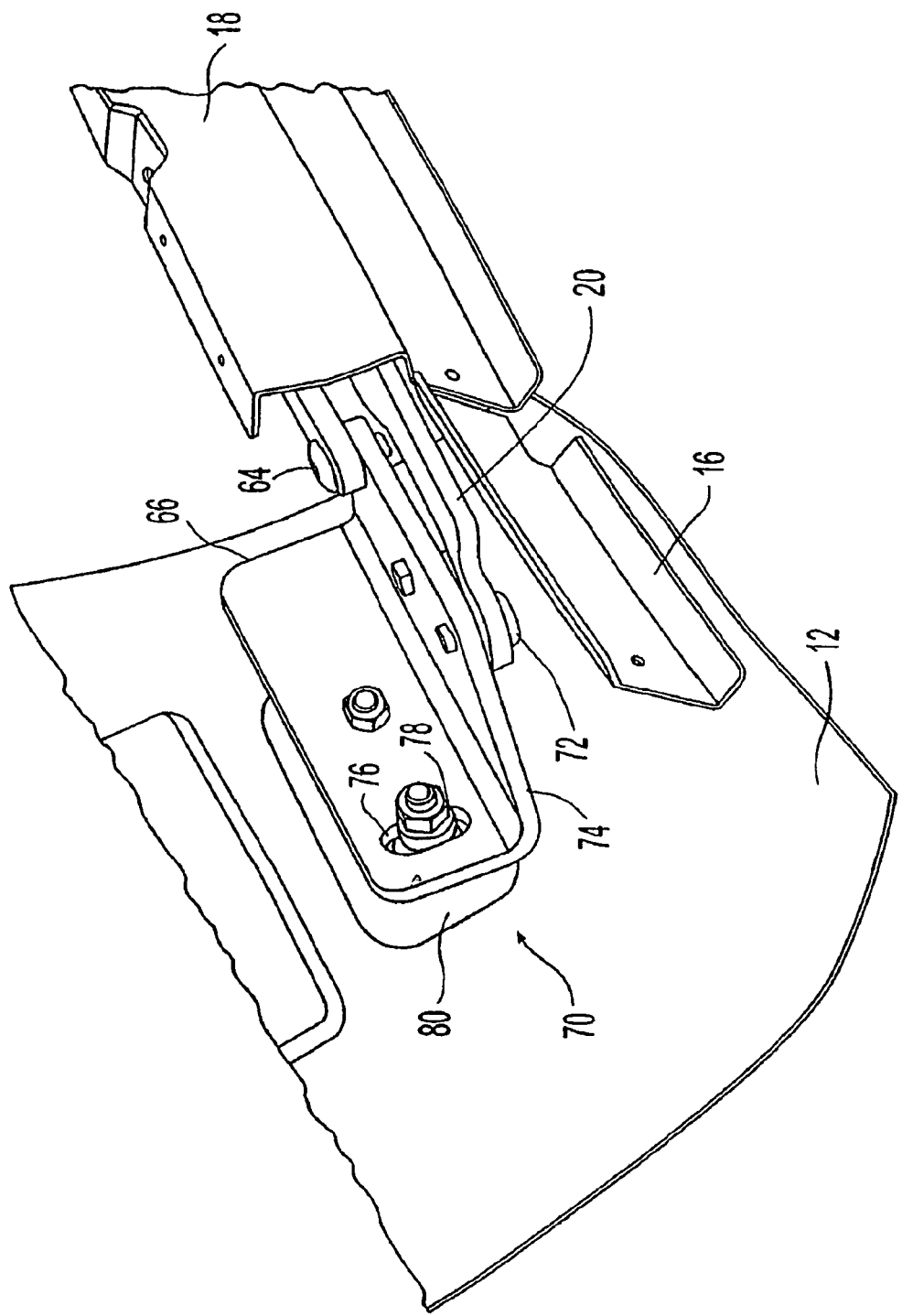
FIG. 7 is an enlarged bottom view of a portion of FIG. 6, illustrating the flexible connection between the front side rail and the header.

To enable this linear Z-type folding movement of top 10, accommodation must be made for lateral movement of the side linkage relative to the header. The mechanism 70 for enabling this lateral flexibility is shown in FIGS. 6 and 7. Middle rail extension 20 is pivoted at 72 to one flange 74 of bracket 66. The other bracket flange contains an elongated slot 76, which receives a stud 78 mounted on a pad 80 on header 12. With this lost motion connection 70, middle rail 18, and the remainder of the side linkage, to pivotally move laterally of header 12, which is necessary to enable top 10 to fold in the above-described manner.

While only a preferred embodiment has been described and shown, obvious modifications are contemplated within the scope of this invention, as defined by the following claims.

The invention claimed is:

1. A convertible top for a vehicle having a longitudinal axis, the convertible top comprising:
    a header having an exterior side;
    a pair of side linkages connected to the header, each side linkage pivotally connected to the vehicle for moving the convertible top between a raised position and a stored position, the exterior side of the header facing upwards in both the raised and stored positions; and
    each side linkage pivotally connected to the header and moving laterally away from the longitudinal axis as the convertible top moves between the raised and stored positions.

2. The convertible top of claim 1, wherein each side linkage includes a plurality of link arms pivotally connected together and structured for the lateral movement.

3. The convertible top of claim 2, wherein the plurality of link arms define a first four-bar linkage, a second four-bar linkage and a third four-bar linkage.

4. The convertible top of claim 3, wherein the first, second and third four-bar linkages are sequentially arranged.

5. The convertible top of claim 3, wherein the second four-bar linkage interconnects the first and third four-bar linkages.

6. The convertible top of claim 3, wherein first arid second four-bar linkages share a common link arm.

7. The convertible top of claim 3, wherein first and second four-bar linkages share two common link arms.

8. The convertible top of claim 3, wherein the second and third four-bar linkages share a common link arm.

9. The convertible top of claim 3, wherein the second and third four-bar linkages share two common link arms.

10. The convertible top of claim 3, wherein the second four-bar linkage includes a middle rail, and wherein the third four-bar linkage includes a rear rail, the middle and rear rails inverting as the convertible top moves from the raised position to the stored position.

11. The convertible top of claim 1, Wherein each side linkage rotates relative to the header about a generally vertical axis.

12. The convertible top of claim 1, wherein the header includes a pair of brackets pivotally connected to the pair of side linkages, each bracket including a slot limiting the lateral movement of the pair of side linkages.

13. A convertible top for a vehicle having a longitudinal axis, the convertible top comprising:
    a header having an exterior side;
    a pair of side linkages connected to the header, each side linkage pivotally connected to the vehicle for moving the convertible top between a raised position and a stored position, the exterior side of the header facing upwards in both the raised and stored positions, each side linkage pivotally connected to the header and moving laterally away from the longitudinal axis as the convertible top moves between the raised and stored positions; and
    each side linkage including a middle rail and a rear rail, each middle rail and rear rail being connected by two link arms to form a four-bar mechanism;
    the middle and rear rails inverting as the convertible top moves from the raised position to the stored position.

14. The convertible top of claim 13, wherein the middle and rear rails nest in the stored position.

15. The convertible top of claim 13, wherein the middle rail has a convex curvature, and wherein the real rail has a convex curvature, the convex curvatures of both the middle and rear rails facing upwardly in the stored position.

16. A convertible top for a vehicle having a longitudinal axis, the convertible top comprising:
    a header having an exterior side;
    a pair of side linkages for moving the convertible top between a raised position and a stored position, the exterior side of the header facing upwards in the raised and stored positions;
    each side linkage including first, second and third four-bar mechanisms, the first four-bar mechanism connected to the header, the third four-bar mechanism connected to the vehicle, the second four-bar mechanism interposed between the first and third four bar mechanisms; and
    the second four-bar linkage including a middle rail, the third four-bar linkage including a rear rail, the middle and rear rails inverting as the convertible top moves from the raised position to the stored position.

17. The convertible top of claim 16, wherein each side linkage is pivotally connected to the header and moves laterally away from the longitudinal axis as the convertible top moves between the raised and stored positions.

18. The convertible top of claim 16, wherein first and second four-bar mechanisms share two common link arms.

19. The convertible top of claim 16, wherein the second and third four-bar mechanisms share two common link arms.

* * * * *